United States Patent [19]

Vogelzang

[11] Patent Number: 5,941,232
[45] Date of Patent: Aug. 24, 1999

[54] SPACE HEATER WITH NOVEL FUEL LINE ASSEMBLY

[75] Inventor: Steven J. Vogelzang, Holland, Mich.

[73] Assignee: Vogelzang International Corporation, Holland, Mich.

[21] Appl. No.: 08/976,922

[22] Filed: Nov. 24, 1997

Related U.S. Application Data

[63] Continuation-in-part of application No. 08/639,035, Apr. 16, 1996, Pat. No. 5,766,003.

[51] Int. Cl.$^6$ ....................................................... F24H 3/02
[52] U.S. Cl. .................................. 126/110 B; 126/110 D; 126/104 R; 432/222
[58] Field of Search ........................... 126/110 B, 110 C, 126/110 D, 104 R, 104 A; 432/222

[56] References Cited

U.S. PATENT DOCUMENTS

| | | |
|---|---|---|
| 32,752 | 7/1861 | Case . |
| 350,544 | 10/1886 | Mckenny et al. . |
| 468,065 | 2/1892 | Shedlock . |
| 1,109,920 | 9/1914 | Glauber . |
| 1,183,354 | 5/1916 | Dittman . |
| 1,327,106 | 1/1920 | Leahy . |
| 1,456,718 | 5/1923 | Anderson . |
| 2,307,616 | 1/1943 | Booth ........................................ 221/77 |
| 2,815,889 | 12/1957 | Stetz ......................................... 222/189 |
| 3,984,132 | 10/1976 | Sarson ...................................... 285/222 |
| 4,036,402 | 7/1977 | Taylor ........................................ 222/1 |
| 4,081,238 | 3/1978 | Briggs et al. ............................ 432/222 |
| 4,089,642 | 5/1978 | Briggs et al. ............................ 432/222 |
| 4,340,362 | 7/1982 | Chalupsky et al. ..................... 432/222 |
| 4,443,187 | 4/1984 | Shaftner et al. ......................... 432/222 |
| 4,532,914 | 8/1985 | Thomas et al. ....................... 126/110 C |
| 4,572,406 | 2/1986 | Pratt et al. ................................. 222/39 |
| 4,640,446 | 2/1987 | Walker .................................... 222/416 |
| 4,852,916 | 8/1989 | Johnson ................................... 285/187 |
| 4,858,959 | 8/1989 | Parrow ...................................... 285/39 |

FOREIGN PATENT DOCUMENTS

| | | |
|---|---|---|
| 1187059 | 9/1959 | France . |
| 0013913 | of 1898 | United Kingdom . |

*Primary Examiner*—Larry Jones
*Attorney, Agent, or Firm*—Price, Heneveld, Cooper, DeWitt & Litton

[57] ABSTRACT

A portable space heater in which a fuel discharge nozzle discharges fuel into a combustion chamber from a fuel tank. A rigid non-flexible metal tube extends between the nozzle and tank. The tank includes an opening with a closure member in the opening. The closure member includes an opening into which a tube compression fitting can be secured for securely affixing one end of the tubing. In the preferred embodiment, the tank is plastic and the closure member is an insert which is insert molded into the top of the tank. In another embodiment, the tank can be metal with the closure member welded to the top wall thereof. In still another embodiment, the closure member is a cap threaded on a threaded opening. In all embodiments, the fuel filter is located inside the tank and is accessible by withdrawing it from the tank through an opening in the insert.

22 Claims, 5 Drawing Sheets

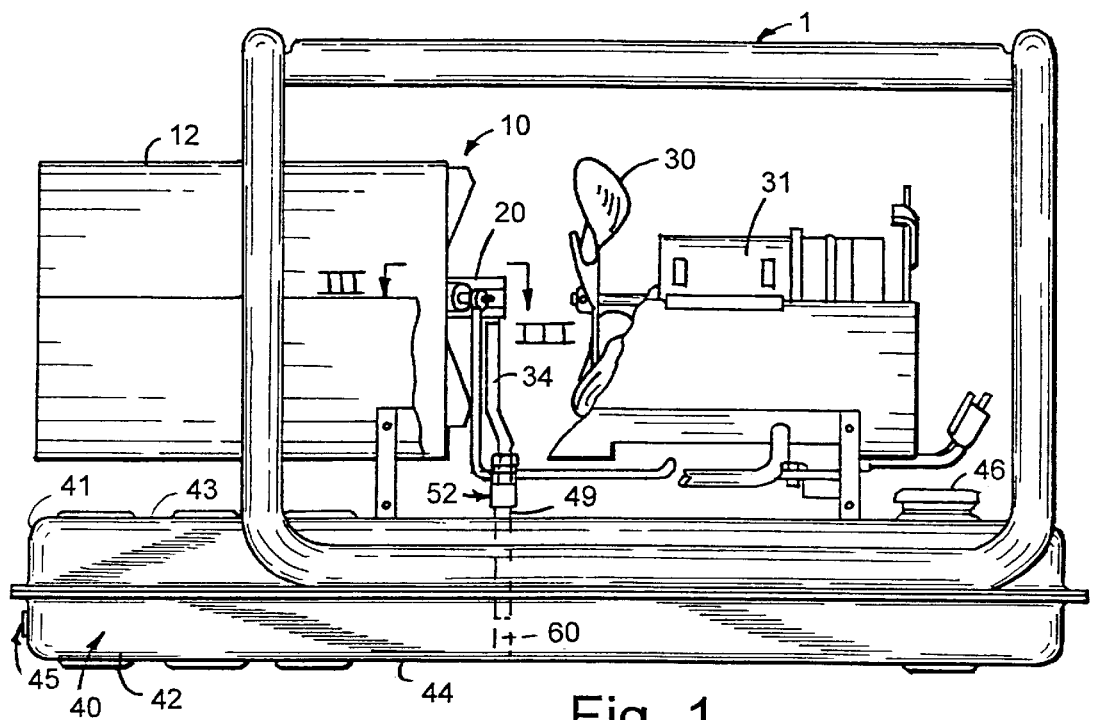
Fig. 1
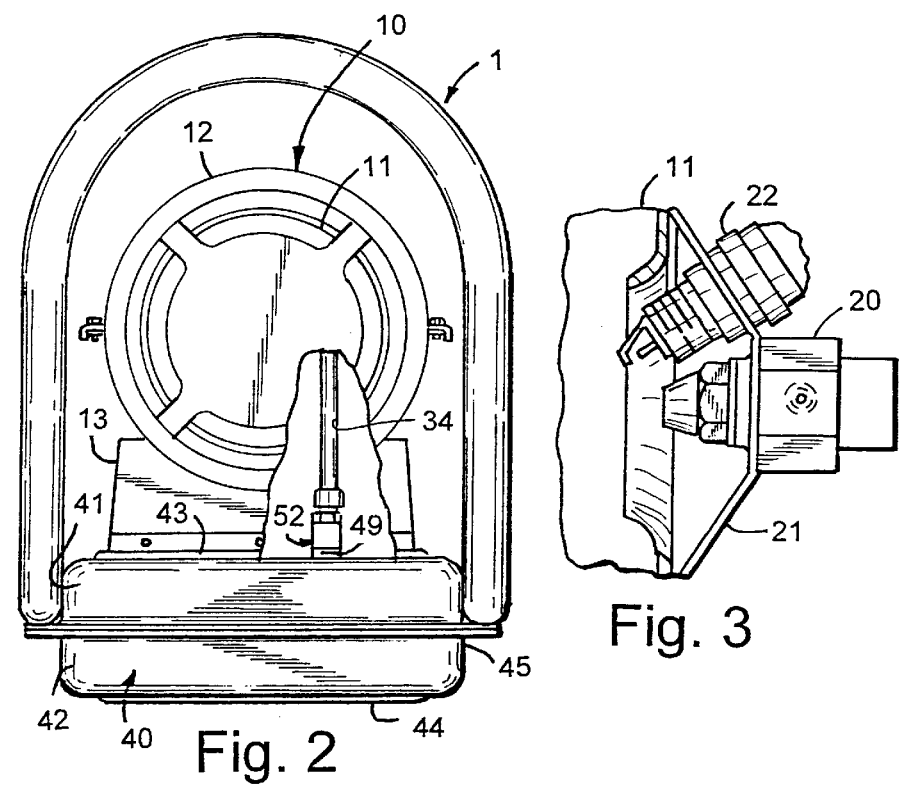
Fig. 2
Fig. 3

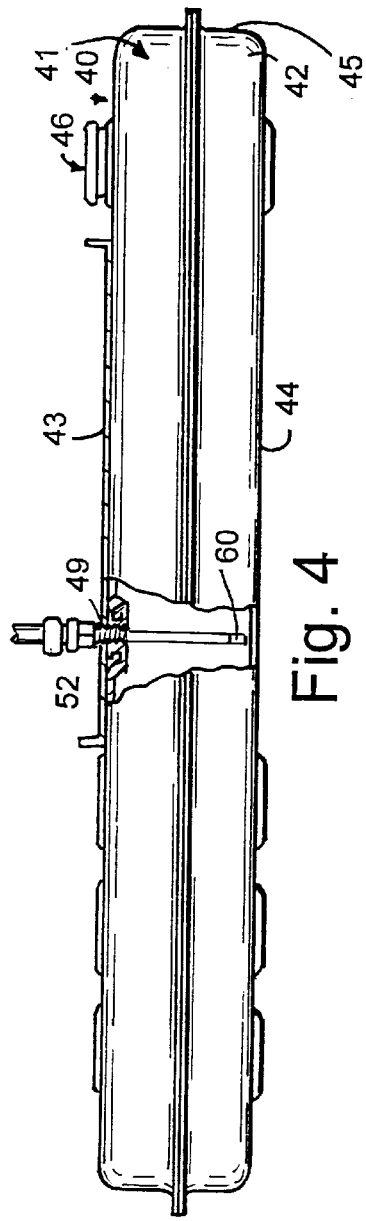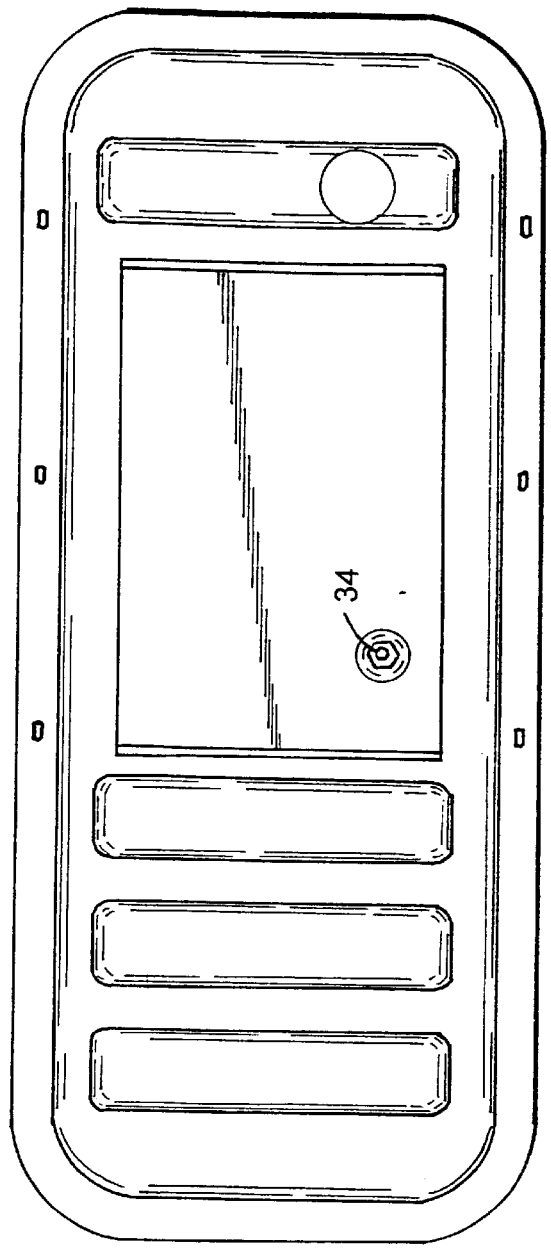

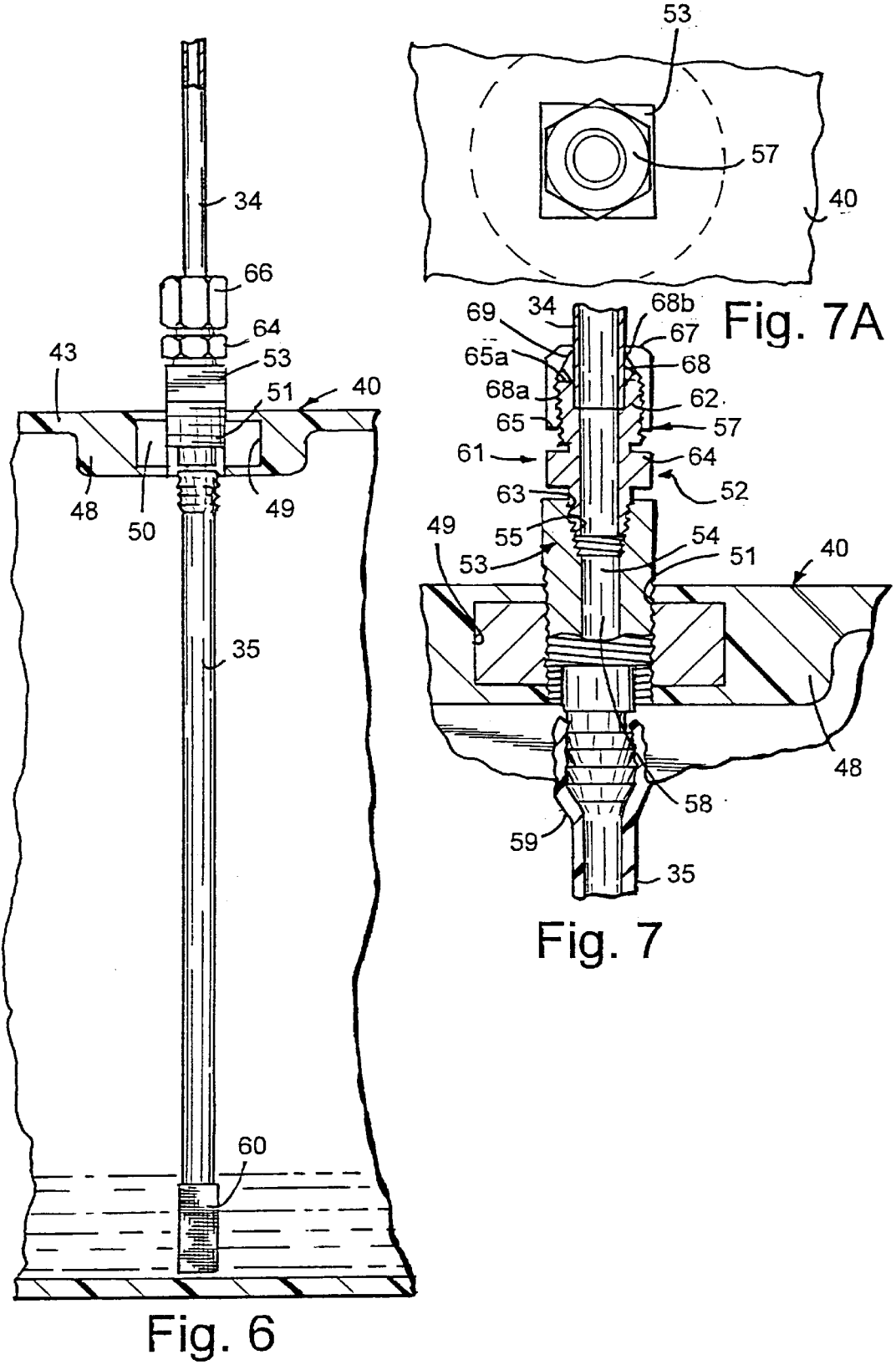

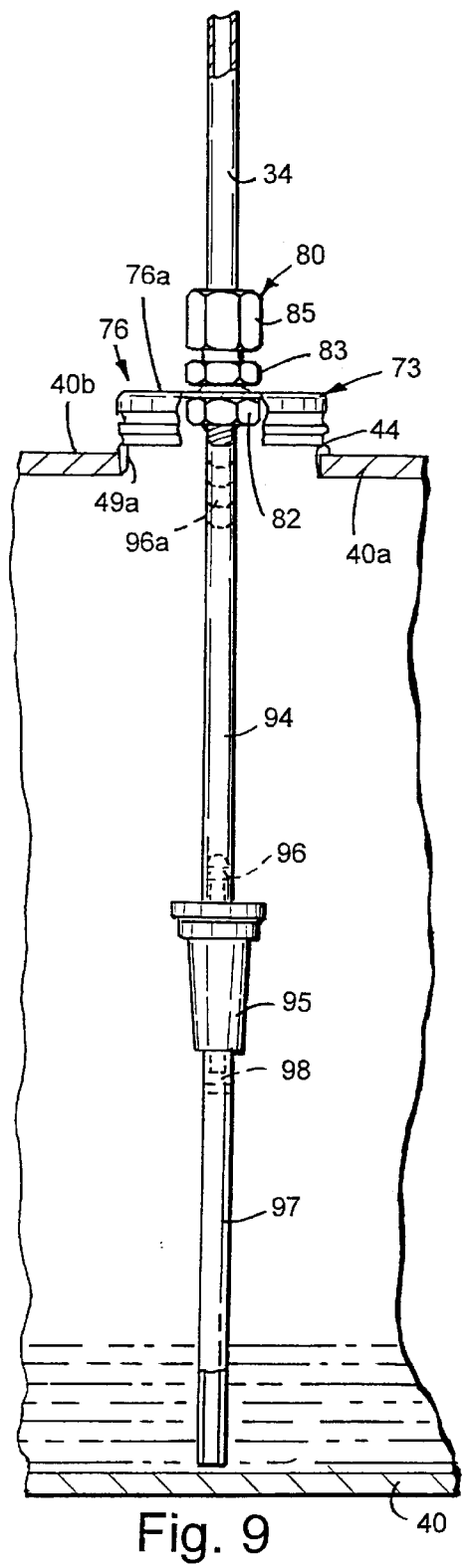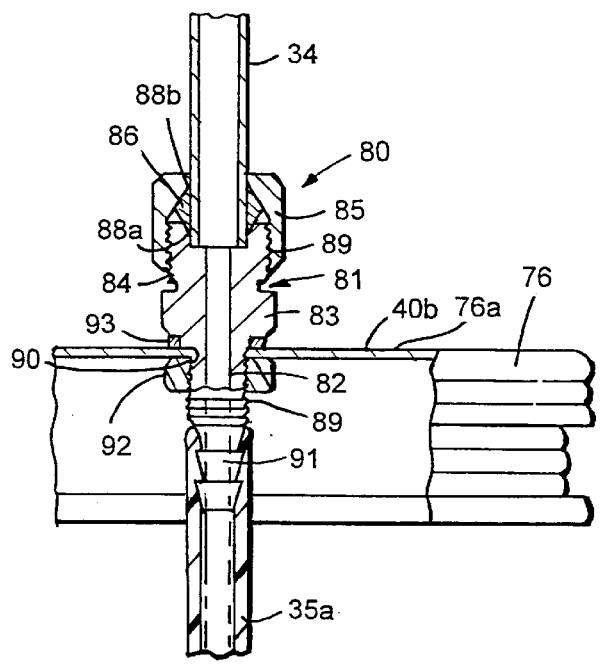
Fig. 9
Fig. 10

SPACE HEATER WITH NOVEL FUEL LINE ASSEMBLY

This application is a continuation-in-part of U.S. patent application Ser. No. 08/639,035, filed on Apr. 16, 1996, and entitled "SPACE HEATER WITH NOVEL FUEL LINE ASSEMBLY." Now U.S. Pat. No. 5,766,003 patented Jun. 19, 1998. This invention relates to a space heater and particularly a portable space heater having a novel fuel line assembly. This invention is also related to the combination of such novel fuel line assembly with either a metal or plastic fuel tank.

BACKGROUND OF THE INVENTION

Portable heaters have been in existence for a long time and have been the subject of much development effort. Examples of this type of portable heater is disclosed in U.S. Pat. Nos. 4,081,238 and 4,089,642. Because of the dangerous nature of such heaters, certain standards have been established by Underwriter Laboratories (UL). One such standard involves the fuel line assembly which is connected between the fuel tank and the fuel discharge nozzle which discharges fuel into the combustion chamber for ignition by an ignition element such as a spark plug. In order to meet UL approval, the standard for the fuel line assembly requires a rigid metal tube connection between the fuel discharge nozzle assembly and the tank. Although meeting this standard is required to mark the space heater as having met UL approval, an addendum standard permits flexible hoses such as rubber or other synthetic material for transferring the fuel from the fuel tank to the nozzle of the burner. UL will not certify portable heaters that utilize a flexible hose. The flexible hose presents the problem of connecting the flexible hose securely to the tank and the nozzle assembly. Flexible rubber or synthetic rubber hose is subject to rot and deterioration. This problem is critical in that if the rubber hose is severed (cut) or broken between the tank and the fuel discharge nozzle assembly, fuel spills will result and catch on fire.

One challenging problem in utilizing a rigid metal tube such as steel, copper, or aluminum, is the dilemma of how to connect the rigid metal tube to the tank and to the fuel filter and particularly at the same time provide access to service the fuel filter within the tank. This problem has resulted in the present day manufacturers of portable space heaters of the type as disclosed in U.S. Pat. Nos. 4,081,238 and 4,089,642 utilizing flexible hose and therefore the present day units cannot be certified as meeting UL approval and cannot be marked as such since they have only been tested to the addendum standard. To date, the reason for using the flexible hose is that those skilled in the art have not been able to conceive of any way to connect a rigid metal tube to the tank so that it is sufficiently secure and to eliminate the possibility of the rigid tube being disconnected from the tank by reason of movement, jarring, etc., of the portable heater. Apparently, the manufacturers of such portable heaters have relied upon the flexible hose to absorb any such jarring movements. This is dangerous in the fact that flexible hose can be jarred loose which could result in a fire.

Another challenging problem in the type of portable heaters as above described is the cost of production of such heaters. Therefore, there is a constant effort to modify the various components of the heater. The present invention preferably utilizes a plastic tank and a unique connection to it of a rigid metal tube.

SUMMARY OF THE INVENTION

This invention enables the use of a rigid metal tube to be connected to and extending between the nozzle assembly and the tank, thus satisfying the UL standard.

In accordance with this invention, the use of a rigid non-flexible tube is accomplished by providing a tank which has two openings. The first of the openings is capped and is a standard opening through which fuel is permitted to be poured into the tank. The second opening is provided in the upper wall of the tank and has a closure member having a third opening therethrough for receiving a fitting assembly. A fitting assembly is received within the opening of the closure member. It has one end extending away from the tank. This one end has a first connector portion connected to the rigid metal tube. The fitting also has a second connector portion operatively connecting a fuel filter tube extending downwardly into the tank. A fuel filter is provided inside the tank operatively connected to the end of the fuel tube.

My preferred embodiment of this invention is to utilize a rigid plastic tank which reduces the cost and weight of the portable heater. My preferred connection of the metal tube to the plastic tank is to provide a metal insert for the closure member. This metal insert is insert molded within the top wall of the plastic tank and is provided with a tapped opening. The fitting assembly is provided with an outer threaded portion screwed into the tapped opening. The fitting assembly at its upper end extending away from the tank includes a first connector portion for connection to the rigid metal tube while the lower end of the fitting includes a second connector portion for operatively connecting the filter tube. In this embodiment, the relative sizes of the tapped opening in the insert and the cross section of the filter is such as to permit the filter to pass through the tapped opening.

In the event a metal tank is utilized, the closure member in one embodiment includes a cap welded to the tank in the second opening in the top wall of the tank. This cap or insert includes a tapped opening for receiving the fitting to which the metal tube and the filter tube are connected in the same fashion as described above in conjunction with the plastic tank.

In another embodiment as disclosed in copending application Ser. No. 08/639,035, the use of a rigid non-flexible tube in this combination is accomplished by providing a tank which has two capped openings. The first of the capped openings is a standard opening through which fuel is permitted to be poured into the tank. The second capped opening is substantially identical to the first mentioned capped opening, both of which have removable caps. The difference is that the second cap, which is removable from the additional capped opening, has an opening in the top thereof through which it receives a bulkhead fitting which includes an upper portion and a lower portion separated by a flange. The lower portion includes a threaded section immediately below said flange and a barbed connector section for connecting to a hose on which a filter is mounted. The upper portion includes a connector for connecting the rigid tube to the fitting. The lower portion of the fitting extends through the opening in the top wall of the cap. The top wall is clamped between the flange of the fitting and a nut threaded onto the threaded section of the lower end of the fitting. This securely connects the fitting to the cap which in turn is secured to the tank by the internal threads of the cap. A rigid metal tube is connected to the upper portion of the fitting. A flexible hose is connected to the lower portion of the fitting which extends into the tank and on which a fuel filter is mounted. Preferably, the tank is constructed of a rigid plastic.

BRIEF DESCRIPTION OF THE DRAWINGS

Referring to the drawings:

FIG. 1 is a side elevational view of the portable heater with a novel fuel line assembly in accordance with my invention;

FIG. 2 is a front elevational view of the heater in FIG. 1 cut away to disclose a portion of the fuel line assembly;

FIG. 3 is a partial cross section taken along the plane III—III of FIG. 1;

FIG. 4 is a side elevational view of the tank forming a part of this invention cut away to disclose the novel fuel line assembly;

FIG. 5 is a top plan view of the tank as disclosed in FIG. 4;

FIG. 6 is an enlarged cross-sectional, cut away section of the tank forming a part of this invention and disclosing a side elevational view of one embodiment of the fuel line assembly for the heater of my invention;

FIG. 7 is an enlarged cross-sectional view of one embodiment of the connection of the rigid hose or tube to a plastic tank of the portable heater;

FIG. 7A is a top plan view of the connection disclosed in FIG. 7;

FIG. 9 is an enlarged cross-sectional view of another embodiment of the connection of the rigid hose or tube to either a metal or plastic tank as disclosed in copending U.S. patent application Ser. No. 08/639,035; and FIG. 10 is an enlarged cross-sectional view of the embodiment of the invention of FIG. 9.

DETAILED DESCRIPTION OF THE PREFERRED EMBODIMENT

Figure 8A:
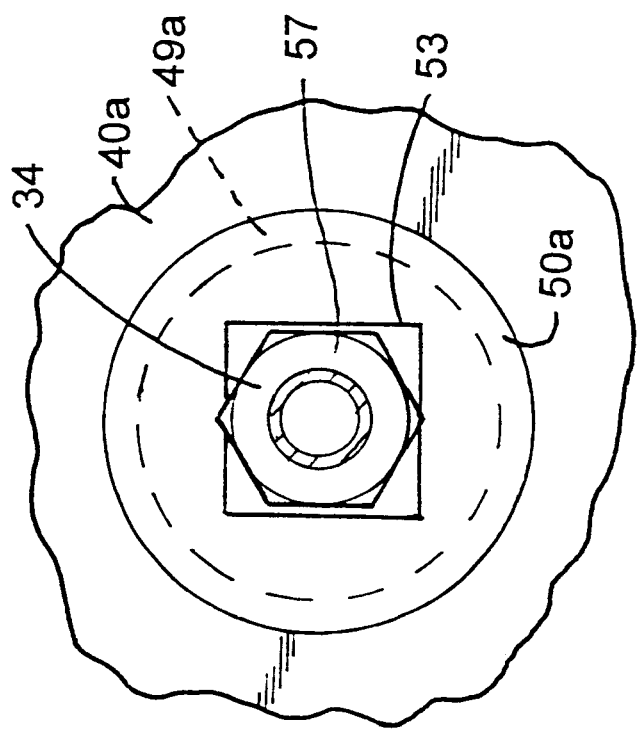
FIG. 8A is a partial plan view of the connection of FIG. 8.

Referring to the drawings, FIGS. 1 and 2 discloses the portable heater of this invention with the novel fuel line assembly shown in combination with various components which are generally included in portable heaters of this type. Reference numeral 1 designates the portable heater which includes the heater unit 10 comprising a combustion chamber 11 (FIG. 2) located within the cowling 12. The combustion chamber 11 and cowling 12 are supported in a well-known manner such as the saddle shaped support member 13 which is not disclosed in FIG. 1 for reasons of clarity. A nozzle assembly 20 (FIGS. 1 and 3) is mounted at one end of the combustion chamber by the bracket 21 which also supports the ignitor 22 which in this instance is disclosed as a spark plug as is well-known in the art. The ignitor 22 is located immediately adjacent the nozzle 20 for igniting the fuel, which ignition is supported by an air supply means not disclosed. Suffice it to say that the combustion of the fuel takes place within the combustion chamber 11.

Located rearwardly of the heating unit 10 is a fan 30 driven by the motor 31. The fan forces air through the heating unit 10 into the space to be heated. The nozzle is supplied fuel from the tank 40 through the metal rigid tube 34 which is an important element of the novel fuel line assembly. It should be understood the aforegoing sketchy structural description of the components of the portable heater provides the environment for the improved combination of the present invention, the features of which will now be more particularly described.

Referring to FIGS. 4–7 in conjunction with FIGS. 1, 2, and 3, an important and essential element of this invention is the rigid non-flexible metal tube 34 connected to and between the nozzle assembly 20 and the tank 40. As previously stated in the summary of this invention, although UL approval requires that the tube 34 be rigid and metallic, those skilled in the art have consistently used a flexible hose because of their inability to conceive of how a rigid metal tube with an attached fuel filter could be connected to the tank. It should be understood that by rigid metal tube is meant one constructed of a material such as steel, copper, or aluminum.

Referring to FIGS. 4–7, the preferred form of this invention utilizes a plastic tank 40 formed of two parts 41 and 42 secured together at their peripheries to form the top wall 43, the bottom wall 44, and the side walls 45. A capped opening 46 is provided through which fuel can be poured into the interior of the tank 40. A second opening 49 is provided in which a closure member or insert 50 is insert molded within thickened portion 48 of the top wall 43 of the tank 40. Thus, the insert or closure member 50 is partially encapsulated within the thickened portion 48 of the top wall of the tank 40. The closure member or insert 50 is a metal member having a threaded or tapped opening 51 for receiving a fitting assembly 52 which includes an elongated threaded member 53 screwed into the tapped opening 51.

Member 53 includes a central opening 54 extending throughout the length of the elongated threaded member 53. The upper end of the central opening 54 is threaded at 55. Threaded end 55 receives a threaded copper tubing compression fitting 57 for connecting the copper tubing 34 to elongated threaded member 53. A downwardly extending part 58 having a barbed end 59 is provided over which hose 35 is secured by a slip fit.

Compression fitting 57 includes a member 61 having upper threaded end 62 and lower threaded end 63 between which is located the nut-like flange 64 provided for a wrench to engage member 61 and thread its threaded end 63 onto the threaded opening 55 of the elongated threaded member 53. Member 61 has a central opening 65 extending therethrough. The top end of the opening is sized to receive the metal tube 34. A compression cap 67 is threaded on the threaded end 62 and receives the sleeve 68 which is slid over tube 34 and having a flared lower end 68a which bottoms on the flared end 65a of opening 65. The inner upper portion of compression cap is shaped at 69 so as to compress against the flared upper end 68b side of the end of tube 34 to secure the end of metal tube 34 to the compression fitting 57. Thus, metal tube 34 is secured to tank 40.

Figure 8:
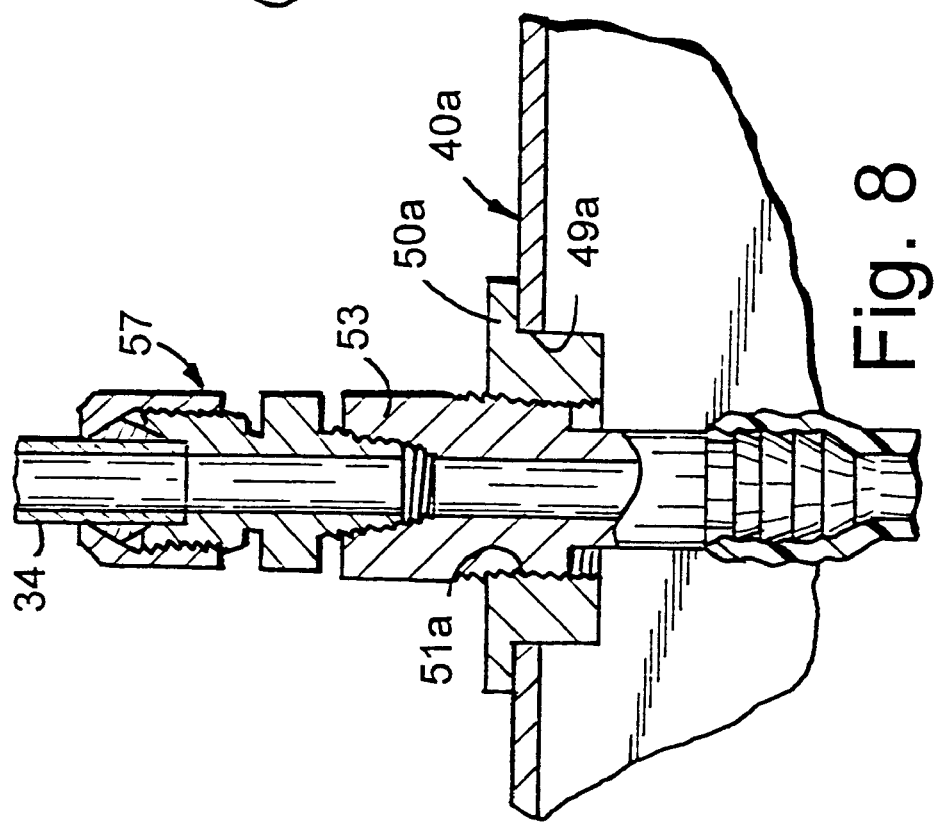
FIG. 8 is an enlarged cross-sectional view of one embodiment of the connection of the rigid hose or tube to a metal tank of the portable heater.

Referring to FIGS. 8 and 8A, they disclose the connecting structure of FIGS. 6 and 7 to a metal tank 40a which includes an opening 49a in which an enclosure or insert 50a is secured by any means such as welding. The enclosure or insert 50a includes a tapped opening 51a like that of 51 as disclosed in FIGS. 6 and 7. Otherwise, the entire connection is the same as described in relation to FIGS. 6 and 7.

Another embodiment of this invention is as disclosed in copending application Ser. No. 08/639,035 (FIGS. 9 and 10) wherein the rigid metal tube 34 is connected to tank 40b by providing a specially designed tank, either plastic or metal, which includes two capped openings. Capped opening 73 includes upwardly extending flange 75 formed with threads on which the cap 76 can be securely screwed. Top wall 76a of cap 76 includes an opening in which bulkhead fitting 80 is secured so as to provide a secure connection of cap 76 to the rigid tube 34.

FIG. 10 discloses in greater detail the connection of fitting 80 to the cap 76 and also the connection of tube 34 to the bulkhead fitting 80. As disclosed in FIG. 10, bulkhead fitting 80 includes an upper portion 81 and a lower portion 82 separated by a nut-like flange 83. The upper portion constitutes a compression fitting which includes a threaded portion 84 on which the cap 85 is threaded. Cap 85 contains a sleeve insert 86 which has ends 88a and 88b which taper radially inwardly. Tube 34 is received within the insert sleeve 86 and when inserted, engages the ends 88a and 88b so that there is a tight fit between the sleeve insert 86 and tube 34. In obtaining a secure and sealed connection between the upper portion 81 and tube 34, the sleeve 86 is contained within the cap 85 over tube 34 which bottoms-out in the fitting. The cap 85 is first put on finger tight and then is secured with a wrench an additional 1¼ turns. This forces ends 88a and 88b of sleeve 86 against the enclosed walls of cap 85 so as to compress ends 88a and 88b against the end of tube 34 and secure it to the compression fitting and to tank 40b.

The bulkhead fitting 80 is secured to the top wall 76a preferably before connecting tube 34 to the upper portion 81 of the fitting 80. This is accomplished by inserting the lower portion 82 of fitting 80 through the opening 90 with the nut-like flange 83 abutting the top wall 76a. As will be noted, the lower portion 82 of fitting 80 is threaded for a predetermined length to provide the threaded portion 89. Below threaded portion 89 a barbed connector portion 91 for a flexible hose is provided. Having inserted the lower portion 82 through opening 90, the nut 92 is threaded on the threaded portion 89 clamping the top wall 76a between the nut-like flange 83 and the nut 92 between which is provided an O-ring seal 93.

The fuel line assembly also includes a flexible hose 94 forced over the tubular barbed connector end 91. A fuel filter 95, which can be of many different designs, is mounted by means of the barbed connector 96. Another flexible hose 97 is mounted on the lower end of fuel filter 95 by means of the barbed connector 98.

Having described in detail the various elements of my invention, it should become evident that we have accomplished by my invention that which those skilled in the art have failed to accomplish; that is, a portable heater in which the fuel line between the fuel discharge nozzle and the fuel tank can now be a rigid metal (copper, aluminum, or steel tube) member. Further, my invention provides for a less costly and lighter portable heater by reason of the possible alternative utilization of a plastic tank as opposed to a metal tank. In addition, my invention can be easily installed and still provide a means for changing the fuel filter in the fuel line.

While I have described specific structural features of my invention, it should be understood that the invention is not limited to such specific features and that other forms or modifications within the spirit of this invention are conceivable within one skilled in the art. Therefore this invention shall be limited only within the legitimate and valid scope of the appended claims.

The invention claimed is:

1. A portable space heater having a combustion chamber; a fuel discharge nozzle for discharging fuel into said combustion chamber; an ignition element located adjacent said fuel discharge nozzle; a fuel tank; a fuel line assembly extending between said fuel discharge nozzle and said tank; said fuel line assembly comprising:

a rigid non-flexible metal tube extending between said nozzle and said tank;

said tank having a bottom wall, side walls, and an upper wall;

a first capped opening in the upper wall of said tank and having a removable cap provided to be opened for permitting the pouring of fuel into said tank;

a second opening in the upper wall of said tank and having a closure member, said closure member having a third opening therethrough for receiving a fitting assembly;

a fitting assembly received within the opening of said closure member, said fitting assembly having one end extending away from said tank, said one end having a first connector portion connected to said rigid metal tube, said fitting having a second connector portion for operatively connecting a fuel filter tube extending downwardly into said tank; and a fuel filter located inside said tank and operatively connected to said fuel tube.

2. The portable space heater of claim 1 in which the relative sizes of said third opening and said filter is such as to permit said filter to pass through said third opening.

3. The portable space heater of claim 1 in which said closure member is a metal insert closing said second opening.

4. The portable space heater of claim 3 in which said third opening in said metal insert is a tapped opening and said fitting assembly includes an outer threaded portion screwed into said tapped opening.

5. The portable space heater of claim 4 in which said fitting assembly includes a separate elongated part which includes said outer threaded portion and a fourth opening extending therethrough, said fourth opening having an upper threaded end receiving a threaded connection supporting the first connector portion connected to said metal tube; and said elongated part having a part extending downwardly therefrom supporting said fuel filter tube inside said fuel tank.

6. The portable space heater of claim 4 in which said tank is molded of plastic material and said metal insert is insert molded over said second opening in a portion of the upper wall of said tank.

7. The portable space heater of claim 4 in which said tank is constructed of metal and said metal insert is secured over said second opening.

8. The portable space heater of claim 6 in which said fitting assembly includes a separate elongated part which includes said outer threaded portion and a fourth opening extending therethrough, said fourth opening having an upper threaded end receiving a threaded connection supporting the first connector portion connected to said metal tube; and said elongated part having a part extending downwardly and supporting said fuel filter tube inside said fuel tank.

9. The portable space heater of claim 7 in which said fitting assembly includes a separate elongated part which includes said outer threaded portion and a fourth opening extending therethrough, said fourth opening having an upper threaded end and the other of said receiving a threaded connection supporting the first connector portion connected to said metal tube; and said elongated part having a part extending downwardly and supporting said fuel filter tube inside said fuel tank.

10. The portable space heater of claim 3 in which the relative sizes of said third opening and said filter is such as to permit said filter to pass through said third opening.

11. The portable space heater of claim 4 in which the relative sizes of said third opening and said filter is such as to permit said filter to pass through said third opening.

12. The portable space heater of claim 5 in which the relative sizes of said third opening and said filter is such as to permit said filter to pass through said third opening.

13. The portable space heater of claim 6 in which the relative sizes of said third opening and said filter is such as to permit said filter to pass through said third opening.

14. The portable space heater of claim 7 in which the relative sizes of said third opening and said filter is such as to permit said filter to pass through said third opening.

15. The portable space heater having a combustion chamber; a fuel discharge nozzle for discharging fuel into said combustion chamber; an ignition element located adjacent said fuel discharge nozzle; a plastic fuel tank; a fuel line assembly extending between said fuel discharge nozzle and said tank; said fuel line assembly comprising:

a rigid non-flexible metal tube extending between said nozzle and said plastic tank;

said plastic tank having a bottom wall, side walls, and an upper wall;

an opening in the upper wall of said plastic tank and including a closure member insert molded in the upper wall of said plastic fuel tank, said closure member having a second opening therethrough for receiving a fitting assembly;

a fitting assembly received within the opening of said closure member, said fitting assembly having one end extending away from said tank, said one end having a first connector portion connected to said rigid metal tube, said fitting having a second connector portion for operatively connecting a fuel filter tube extending downwardly into said tank; and a fuel filter located inside said tank and operatively connected to said fuel tube.

16. The portable space heater of claim 15 in which the relative sizes of said second opening and said filter is such as to permit said filter to pass through said third opening.

17. The portable space heater of claim 15 in which said closure member is metal.

18. The portable space heater of claim 15 in which said second opening in said metal insert is a tapped opening and said fitting assembly includes an outer threaded portion screwed into said tapped opening.

19. The portable space heater of claim 18 in which said fitting assembly includes a separate elongated part which includes said outer threaded portion and a third opening extending therethrough, said third opening having an upper threaded end receiving a threaded connection supporting the first connector portion connected to said metal tube; and said elongated part having a part extending downwardly and supporting said fuel filter tube inside said fuel tank.

20. The portable space heater of claim 16 in which said fitting assembly includes a separate elongated part which includes said outer threaded portion and a third opening extending therethrough, said third opening having an upper threaded end receiving a threaded connection supporting the first connector portion connected to said metal tube; and said elongated part having a part extending downwardly and supporting said fuel filter tube inside said fuel tank.

21. The portable space heater of claim 18 in which the relative sizes of said second opening and said filter is such as to permit said filter to pass through said second opening.

22. The portable space heater of claim 19 in which the relative sizes of said second opening and said filter is such as to permit said filter to pass through said second opening.

* * * * *